April 21, 1936.  D. G. DUTY ET AL  2,037,968

SAFETY SIGNAL DEVICE FOR TIRES

Filed May 19, 1934

Inventors
Dorsey G. Duty
and
Lawrence D. Rogers
By Percy Harwood
Attorney

Patented Apr. 21, 1936

2,037,968

UNITED STATES PATENT OFFICE 2,037,968

SAFETY SIGNAL DEVICE FOR TIRES

Dorsey G. Duty and Lawrence D. Rogers, Akron, Ohio

Application May 19, 1934, Serial No. 726,562

7 Claims. (Cl. 116—34)

Our invention relates to air pressure indicating means for automobile tires.

The invention has for its principal object to provide pressure indicating means for apprising a motorist when the pressure in a tire drops below a predetermined minimum, due to valve leakage, punctures or other causes.

Another object of the invention is to provide pressure indicating means for giving an audible signal by means of air released from the tire when the air pressure in the tire drops below a predetermined minimum.

A further object of the invention is the provision of means for shutting off the release of air when the pressure in the tire drops below a predetermined minimum.

Other objects and advantages of the invention will be apparent from the following specification considered with the accompanying drawing, in which.

Figure 1:
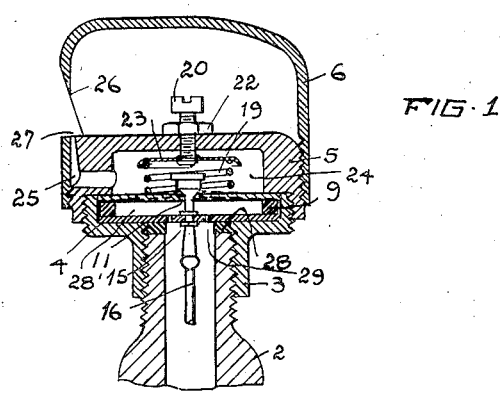
Figure 1 is a transverse section through the device applied to a tire valve stem.
Figure 2:
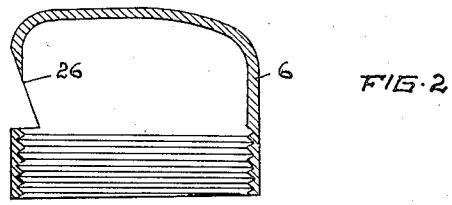
Figure 2 is a transverse section through the dust cap.
Figure 3:
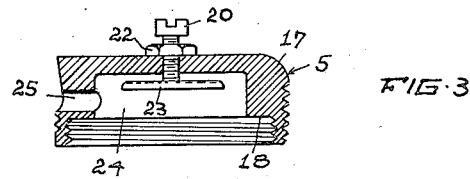
Figure 3 is a transverse section through the diaphragm clamping and spring adjusting member.
Figure 4:
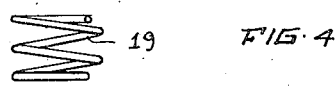
Figure 4 is a side elevation of the coil spring for actuating the diaphragm.

Referring more particularly to the drawing 1 denotes the threaded upper portion of a hollow valve stem 2 of a pneumatic automobile tire, not shown. Secured to the stem 2 is a threaded coupling 3, which supports a diaphragm assembly 4 and a diaphragm clamping and spring adjusting member 5. A washer 28 insures a tight seal at the joint between the coupling 3 and the stem 2. A dust cap 6 is in turn threadedly connected to the member 5.

The diaphragm assembly 4 comprises a relatively rigid perforated metallic plate 7 which seats upon the coupling 3, and a flexible diaphragm 8, of rubber or other suitable material, spaced from and above the metallic plate 7, by means of a sealing washer 9, also of any suitable material. A valve 10 normally closing a valve opening 11 in the diaphragm 8, is formed with a stem 12, which passes loosely through the opening 11 and is fixed to the perforated plate 7, by means of collars 14 and 15. The lower end of the valve 10, engages the stem 16, of a conventional valve, not shown, through which the tire is inflated.

The diaphragm clamping member 5 consists of a chambered cap 17 internally threaded for engagement with coupling 3, and provided with an annular shoulder 18 for clamping the diaphragm assembly in place. A coil spring 19, bears at its upper and lower ends against a headed adjusting screw 20 and the diaphragm 8 respectively, a lock nut 22 being employed to lock the screw in desired adjusted position. A disk 23 secured to the lower end of the screw 20 affords a seat for the spring. The interior of the cap 17 constitutes an air chamber 24, from which air escapes through an outlet 25, and is directed against a beveled portion 26 of the dust cap 6, with sharply audible whistling effect, when the pressure in the tire drops below a predetermined minimum. The beveled area or portion 26 is formed by cutting away a section of the dust cap as at 27.

Figure 5:
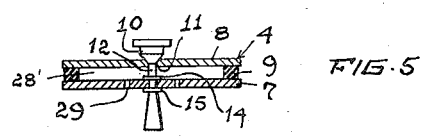
Figures 5, 6, and 7 are transverse sections through the diaphragm assembly, washer and coupling member respectively.
Figure 6:
Figure 7:
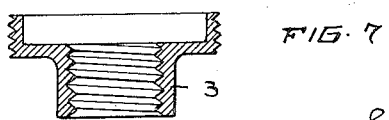

The operation of the device is as follows: Assuming that the adjusting screw 20 has been screwed down sufficiently against the spring 19, bearing upon the spring diaphragm 8, so that the spring will overcome a pressure of ten pounds or greater, exerted thereagainst by the diaphragm, and that the pressure in the tire is above ten pounds, the valve 10 will remain closed, or in Figure 5 position. This action is due to the fact that the pressure of the air entering chamber 28' through openings 29, from the tire, is normally above ten pounds per square inch and consequently the flexible diaphragm 8 will be forced upwardly, as indicated by dotted lines in Figure 1 and the opening 11 in the diaphragm will be closed by the head of valve 10. Of course the valve remains practically stationary at all times, due to its connection with the semi-rigid plate 7. If the pressure in the chamber 28 drops below ten pounds' pressure, due to valve leakage, puncture etc. the spring 19 will force the diaphragm 8 to Figure 1, full line position, thus permitting the air to escape through opening 11 into chamber 24 and thence through passage 25. A warning signal is thus given before the tire becomes damaged, by the action of the escaping air impinging against the sharp edge 26, directly in line with the restricted outer outlet end of passage 25.

Having thus described our invention,

What we claim is:

1. An air pressure indicating means adapted to be screwed to the threaded end of a valve stem of a pneumatic automobile tire comprising a threaded coupling, a valve mounted within said coupling, a yieldable diaphragm embodying a valve seat for said valve, spring means for yieldingly shifting the diaphragm and its valve seat out of engagement with the valve to permit of release of air from the tire through its valve stem, and means for audibly indicating the release of air when said valve seat and valve are in open position.

2. An air pressure indicating means adapted to be screwed to the threaded end of a valve stem of a pneumatic automobile tire comprising a threaded coupling, a valve mounted within said coupling, a yieldable diaphragm embodying a valve seat for said valve, spring means for yieldingly shifting the diaphragm with respect to said valve and holding same out of engagement with said valve, and means for audibly indicating the release of air from the valve stem of a tire having the pressure indicating means attached thereto, said diaphragm being openly exposed to the air pressure of said tire and forced into engagement with its valve at predetermined air pressures, and said spring shifting said diaphragm out of engagement with its valve when the air in said tire drops below predetermined pressure ranges.

3. An air pressure indicating means for automobile tires adapted to be attached to the valve stem of a tire comprising a pressure check valve embodying a rigidly mounted valve and a yieldable diaphragm having a valve seat for said valve, means for yieldingly holding said pressure check valve open and means for audibly indicating the escape of air through said check valve, said check valve being openly exposed to the air pressure of the tire to which said pressure indicating means is connected and held in closed position at air pressure equal to or slightly below the air pressure intended to be carried by said tire.

4. An air pressure indicating means for automobile tires adapted to be attached to the valve stem of a tire as described in claim 3, wherein said rigidly mounted valve includes an extension adapted to engage and cooperate with the valve stem of a conventional tire valve for opening same and exposing the yieldable diaphragm to the air pressure in said tire.

5. An air pressure indicating means for automobile tires adapted to be attached to the valve stem of a tire, provided with a check valve openly exposed to the pressure in said tire, said indicating means comprising a valve assembly embodying a valve supporting, rigid, perforated plate, a valve supported by said plate, and a yieldable diaphragm including a valve seat for the valve supported by said rigid plate, spring means arranged to move said seat from engagement with the valve when the pressure reaches a predetermined value and a signal operated by air passing through said seat.

6. An air pressure indicating means for automobile tires adapted to be attached to the valve stem of a tire, provided with a check valve openly exposed to the pressure in said tire, said indicating means comprising a valve assembly embodying a valve supporting, rigid, perforated plate, a valve supported by said plate, and a yieldable diaphragm including a valve seat for the valve supported by said rigid plate, spring means arranged to move said seat from engagement with the valve when the pressure reaches a predetermined value and a dust cap including a signal operated by air passing through said seat.

7. An air pressure indicating means for automobile tires adapted to be attached to the valve stem of a tire, including a valve assembly embodying a valve supporting rigid perforated plate, a valve supported by said plate, a valve seating member for said valve, spring means for yieldably opening said valve assembly at a predetermined pressure, a dust cap embodying means for audibly indicating the escape of air, said valve seating member being formed as a yielding diaphragm dividing said valve assembly into two compartments, one of which communicates with said tire and the other of which is in communication with the open atmosphere through a restricted outlet arranged to direct a thin stream of air against said means for indicating the escape of air to produce a whistling sound when the air under pressure escapes from the first compartment into the second compartment of the said valve assembly.

DORSEY G. DUTY.
LAWRENCE D. ROGERS.